(12) United States Patent
Li et al.

(10) Patent No.: US 9,034,803 B2
(45) Date of Patent: May 19, 2015

(54) FLUIDS COMPRISING CHITOSAN CROSSLINKED BY TITANATE

(75) Inventors: Jack Li, Sugar Land, TX (US); Philip F. Sullivan, Bellaire, TX (US); Robert Seth Hartshorne, Newmarket (GB)

(73) Assignee: Schlumberger Technology Corporation, Sugar Land, TX (US)

(*) Notice: Subject to any disclaimer, the term of this patent is extended or adjusted under 35 U.S.C. 154(b) by 499 days.

(21) Appl. No.: 13/097,514

(22) Filed: Apr. 29, 2011

(65) Prior Publication Data

US 2012/0277128 A1 Nov. 1, 2012

(51) Int. Cl.
*C09K 8/035* (2006.01)
*C09K 8/90* (2006.01)
*C09K 8/68* (2006.01)

(52) U.S. Cl.
CPC . *C09K 8/905* (2013.01); *C09K 8/68* (2013.01); *C09K 8/685* (2013.01)

(58) Field of Classification Search
None
See application file for complete search history.

(56) References Cited

U.S. PATENT DOCUMENTS

| | | | |
|---|---|---|---|
| 4,579,942 A * | 4/1986 | Brode et al. | 536/84 |
| 4,861,500 A | 8/1989 | Hodge | |
| 6,258,755 B1 | 7/2001 | House et al. | |
| 6,277,792 B1 | 8/2001 | House | |
| 6,358,889 B2 | 3/2002 | Waggenspack et al. | |
| 6,562,762 B2 | 5/2003 | Cowan et al. | |
| 6,607,035 B1 | 8/2003 | Reddy et al. | |
| 6,764,981 B1 | 7/2004 | Eoff et al. | |
| 6,780,822 B2 | 8/2004 | Cowan et al. | |
| 6,843,841 B2 | 1/2005 | Reddy et al. | |
| 6,848,519 B2 | 2/2005 | Reddy et al. | |
| 6,976,537 B1 | 12/2005 | Verret | |
| 7,007,752 B2 | 3/2006 | Reddy et al. | |
| 7,096,947 B2 | 8/2006 | Todd et al. | |
| 7,131,493 B2 | 11/2006 | Eoff et al. | |
| 7,159,656 B2 | 1/2007 | Eoff et al. | |
| 7,178,596 B2 | 2/2007 | Blauch et al. | |
| 7,204,316 B2 | 4/2007 | Dusterhoft et al. | |
| 7,207,387 B2 | 4/2007 | Eoff et al. | |
| 7,256,160 B2 | 8/2007 | Crews | |
| 7,273,099 B2 | 9/2007 | East, Jr. et al. | |
| 7,316,275 B2 * | 1/2008 | Wang et al. | 166/300 |
| 7,322,414 B2 | 1/2008 | Reddy et al. | |
| 7,325,613 B2 | 2/2008 | Reddy et al. | |
| 2002/0098987 A1 | 7/2002 | House et al. | |
| 2005/0051330 A1 | 3/2005 | Nguyen | |
| 2005/0107503 A1 | 5/2005 | Couillet et al. | |
| 2005/0194140 A1 | 9/2005 | Dalrymple et al. | |
| 2005/0197258 A1 | 9/2005 | Nguyen | |
| 2006/0014648 A1 | 1/2006 | Milson et al. | |
| 2006/0169453 A1 | 8/2006 | Savery et al. | |
| 2006/0169454 A1 | 8/2006 | Savery et al. | |
| 2006/0172893 A1 | 8/2006 | Todd et al. | |
| 2006/0211580 A1 | 9/2006 | Wang et al. | |
| 2007/0062697 A1 | 3/2007 | Barbosa et al. | |
| 2007/0277979 A1 | 12/2007 | Todd et al. | |
| 2007/0281869 A1 | 12/2007 | Drochon et al. | |
| 2008/0067108 A1 | 3/2008 | Sarkar et al. | |
| 2008/0085843 A1 | 4/2008 | Wang et al. | |
| 2008/0281000 A1 * | 11/2008 | Daly et al. | 514/778 |
| 2009/0075845 A1 | 3/2009 | Abad et al. | |
| 2009/0255677 A1 | 10/2009 | Bryant et al. | |
| 2010/0212906 A1 | 8/2010 | Fulton et al. | |
| 2011/0053807 A1 | 3/2011 | Panga et al. | |

FOREIGN PATENT DOCUMENTS

EP 1617039 1/2006

OTHER PUBLICATIONS

De Angelis, A.A., Capitani, D., Crescenzi, V.: Sintesis and C CP-MAS NMR Characterization of a New Chitosan-Based Polymeric Network, Macromolecules, vol. 31, Issue 5, Jan. 1, 1998, p. 1595-1601.

Hamdine, M., Heuzey, M.C., Begin, A.: Viscoelastic properites of phosphoric and oxallic acid-based chitosan hydrogels, Rheologica Acta, vol. 45, Issue 5, Jun. 2006, p. 659-675.

Hong, H.J., Jin, S.E., Park, J.S., Ahn, W.S., Kim, C.K.: Accelerated wound healing by smad3 antisense oligonucleotides-impregnated chitosan/alginate polyelectrolyte complex, Biomaterials, vol. 29, Issue 36, Dec. 2008, p. 4831-4837.

Maltese, A., Borzacchiello, A., Mayol, L., Bucolo, C., Maugeri, F., Nicolais, L., Ambrosio, L.: Novel polysaccharides-based viscoelastic formulations for ophthalmic surgery: Rheological characterization, Biomaterials, vol. 27, Issue 29, Oct. 2006, pp. 5134-5142.

Marinez, L., Agnely, F., Leclerc, B., Siepmann, J., Cotte, M., Geiger, S., Couarraze, G.: Crosslinking of chitosan and chitosan/poly(ethylene oxide) beads: A theoretical treatment, European Journal of Pharmaceutics and Biopharmaceutics, vol. 67, Issue 2, Sep. 2007, p. 339-348.

Monteriro, O.A.C., Airoldi, C.: Some studies of crosslinking chitosan-glutaraldehyde interaction in a homogeneous system, International Journal of Biological Macromolecules, vol. 26, Issue 2-3, Nov. 1999, p. 119-128.

Moura, M.J., Figueiredo, M.M., Gil, M.H.: Rheological study of genipin crosslinked chitosan hydrogels, Biomacromolecules, vol. 8, Issue 12, Dec. 2007, p. 3823-2839.

(Continued)

*Primary Examiner* — Susannah Chung
*Assistant Examiner* — Kumar R Bhushan
(74) *Attorney, Agent, or Firm* — Jeremy D. Tillman; Rachel E. Greene; Tim Curington

(57) ABSTRACT

The current application discloses fluids and methods for treating a subterranean formation penetrated by a wellbore. In one aspect, there is provided a fluid comprising chitosan and titanate, where the fluid has an increased viscosity compared with a solution containing chitosan without titanate. In another aspect, there is provided a method of using such fluid to treat a subterranean formation penetrated by a wellbore. The method may comprise mixing chitosan and titanate in a carrying medium, forming a gel comprising chitosan and titanate, introducing the gel into a subterranean formation, and treating the subterranean formation with the gel.

26 Claims, 7 Drawing Sheets

(56) References Cited

OTHER PUBLICATIONS

Nagahama, H., Maeda, H. Kashiki, T., Jayakumar, R., Furuike, T., Tamura, H.: Preparation and characterization of novel chitosan/gelatin membranes using chitosan hydrogel, Carbohydrate Polymers, Article in press, 2008.

Roberts, G.A.F., Taylor, K.E.: Chistosan gels. Part3. The formation of gels by reaction of chitosan with glutaraldehyde, Makromol. Chem., 190, 1989, pp. 951-960.

Wu, H.Z., Hsu, Y.L., Huang, H.L., Chen, J.P., Chen, C.S., Lin, P.: Application of biocoagulant on drinking water treatment, Pract. Periodical of Haz., Toxic, and Radioactive Waste Mgmt., vol. 11, Issue 2, Apr. 2007, p. 92-96.

Xiao, Y., Zhou, X.: Synthesis and properties of a novel crosslinked chitosan resin modified by l-lysine, Reactive and functional polymers, vol. 68, issue 8, Aug. 2008, p. 1281-1289.

International Search Report and Written Opinion issued in PCT/US2012/035849 on Nov. 30, 2012, 13 pages.

\* cited by examiner

FLUIDS COMPRISING CHITOSAN CROSSLINKED BY TITANATE

FIELD OF THE APPLICATION

The current application is generally related to fluids comprising chitosan crosslinked by titanate, which may be particularly useful in the oil and gas industry during the treatment of a subterranean formation penetrated by a wellbore.

BACKGROUND

The statements in this section merely provide background information related to the present disclosure and may not constitute prior art. All references described herein are incorporated by reference in their entireties into the current application.

Chitosan is a linear polysaccharide comprising primarily beta-(1-4)-polysaccharide of D-glucosamine. Chitosan is structurally similar to cellulose, except that the C-2 hydroxyl group in cellulose is substituted with a primary amine group in chitosan. Chitosan is produced commercially by deacetylation of chitin, which is the structural element in the exoskeleton of crustaceans such as crabs, shrimp, etc. and cell walls of fungi, etc.

Historically, the exploration of chitosan has been focused on medical and pharmaceutical applications, due to the inherent biocompatibility and reactive functionality of chitosan. Examples in these respects include using chitosan as an implantable/injectable material, a hemostatic agent, a wound-healing component, etc.

Much of the industrial interest in chitosan however relates to its ability to generate viscous and elastic (hydro)gels via physical or chemical interactions. To date, the most common crosslinkers used with chitosan are dialdehydes such as glyoxal and in particular glutaraldehyde. The aldehyde groups form covalent imine bonds with the amino groups of chitosan, due to the resonance established with adjacent double ethylenic bonds, even though links with hydroxyl groups cannot be completely excluded. Other covalent crosslinkers include diethyl squarate, oxalic acid, and genipin, where the underlying mechanisms of the crosslink remain incompletely elucidated. However, several health issues are associated with the use of these compounds to crosslink chitosan.

The application of chitosan in the oil and gas industry has also been explored to a certain degree. For example, U.S. Pat. No. 7,007,752 discloses a method of using derivatised chitosan with an oxidized polysaccharide such as starch to form a well treatment fluid; U.S. Pat. No. 6,764,981 discloses a method of using oxidized chitosan and acrylamide-based polymer to treat a subterranean formation; U.S. Pat. No. 7,322,414 discloses a crosslinkable-polymer composition comprising an aqueous fluid, a chitosan-reacting polymer, chitosan and a gelation-retarding additive. The entire contents of these patents are incorporated by reference into the current application.

However, none of the references employs chitosan as the primary ingredient in the treatment fluid. Instead, chitosan has been used mainly as an additive or crosslinker in the treatment fluid. There remains a need to further explore compositions and methods that use chitosan as the primary ingredient in a fluid for treating a subterranean formations penetrated by a wellbore, i.e. a chitosan-based treatment fluid for use in the oil and gas industry.

SUMMARY

In one aspect, the current application discloses a fluid for treating a subterranean formation penetrated by a wellbore, where the fluid comprises chitosan and titanate, where the fluid has an increased viscosity compared with a solution containing chitosan without titanate.

In another aspect, there is provided a method of treating a subterranean formation penetrated by a wellbore, comprising mixing chitosan and titanate in a carrying medium, introducing the mixture into a subterranean formation, forming a gel comprising chitosan and titanate, and treating the subterranean formation with the gel. The method may optionally include a further step of introducing a breaker to the fluid to break the gel.

In some embodiments, the fluid and method of the current application are used to suspend a proppant for delivering a proppant to the subterranean formation. In some embodiments, the step of treating the subterranean formation comprises performing a hydraulic fracturing operation on the subterranean formation.

BRIEF DESCRIPTION OF THE DRAWINGS

These and other features and advantages will be better understood by reference to the following detailed description when considered in conjunction with the accompanying drawings.

DETAILED DESCRIPTION OF SOME ILLUSTRATIVE EMBODIMENTS

Figure 1A:
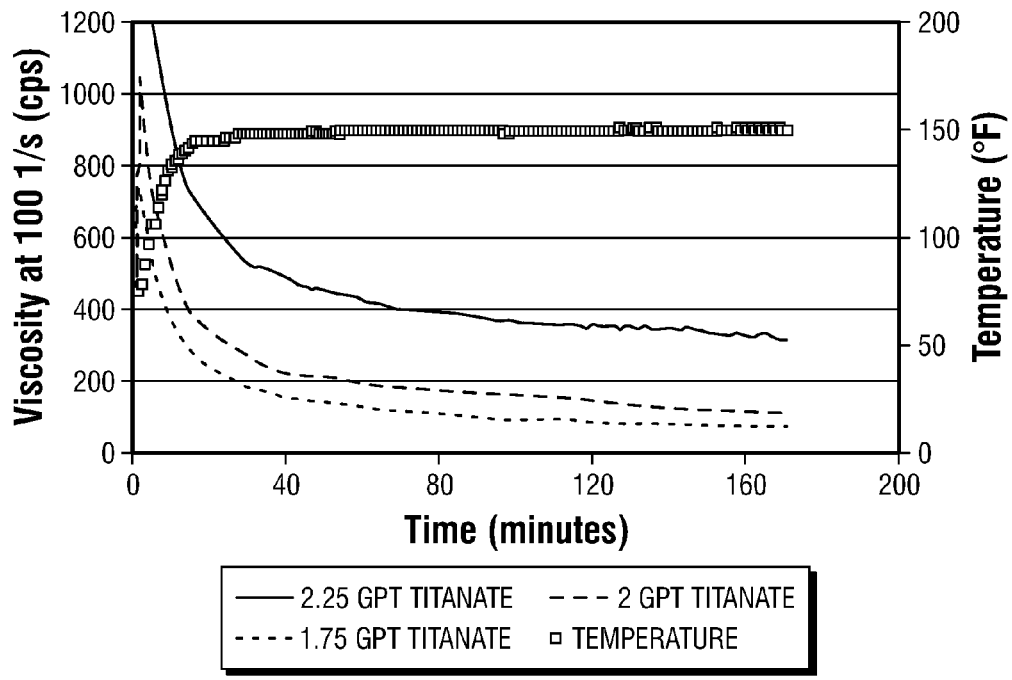
FIG. 1A shows viscosity temperature profiles for fluids containing chitosan crosslinked by titanate at various concentrations at 150° F.

At the outset, it should be noted that in the development of any such actual embodiment, numerous implementation—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

Embodiments of the current application are illustrated below in the context of an oilfield operation commonly known as hydraulic fracturing. However, it should be noted that the principles of the current application may be readily applicable to other operations in the oil and gas industry as well, such as drilling, cementing, logging, completion, production, and so on. Similarly, although embodiments of the current application are illustrated below in the context of oil and gas exploration and production, the principles of the current application can also be used in the field other than the oil and gas industry, such as construction, automobile, mining, just to name a few. With the benefit of the information disclosed herein, people skilled in the art can readily appreciate various features and advantages of the current application and make changes and modifications accordingly. All such changes and modifications should be considered within the spirit of the current application.

In the oil and gas industry, hydraulic fracturing is generally referred to as a method of using pump rate and hydraulic pressure to fracture or crack a subterranean formation. Once the crack is formed, a proppant is pumped into the fracture to prop open the crack and maintain the crack in the opened position after the hydraulic pressure is reduced or removed. Therefore, a high permeability pathway can be formed between the wellbore and a large radius of formation and the production of hydrocarbons can be increased.

Most commercially used fracturing fluids are aqueous liquids, although non-aqueous fracturing fluids such as hydrocarbon-based liquids have also been developed and used in the oilfield. Therefore, the carrying medium in a fracturing fluid can be either aqueous or non-aqueous. Examples of aqueous carrying medium include, but are not limited to, freshwater, seawater, saltwater, brines (e.g. natural brines, formulated brines, saturated brines, unsaturated brines, etc.) or a mixture thereof. Examples of non-aqueous carrying medium include, but are not limited to, diesel, kerosene, alcohol, crude oil, or a mixture thereof. The carrying medium may be supplied from any source available at the wellsite, such as tanks, vehicles, vessels, or pipelines.

According to one aspect of the current application, there is provided a fluid for treating a subterranean formation penetrated by a wellbore, where the fluid comprises chitosan crosslinked by titanate, where the fluid containing chitosan and titanate has an increased viscosity compared with a fluid containing chitosan without titanate.

As used herein, the term "fluid" is to be construed broadly, which may include any substance that has no fixed shape, yields easily to external pressure, and has the tendency to assume the shape of its container. Examples include, but are not limited, a gas, a liquid, a solution, a foam, an emulsion, a suspension, a colloid, a slurry, and so on.

As used herein, the term "chitosan" is to be construed broadly, which may include unoxidized chitosan, oxidized chitosan, unmodified chitosan, modified chitosan, or mixtures thereof. Also, as used herein, the term "chitosan" is intended to include both the chitosan and chitosan salts of mineral or organic acids. Most commercially available chitosan is a partially or fully deacetylated form of chitin, which is a naturally occurring polysaccharide found in crustaceans (e.g. crabs, lobsters and shrimps) and other sources. The chitosan may have a degree of deacetylation that is in the range of from about 50% to about 100%. In certain embodiments, the chitosan may have a degree of deacetylation that is in the range of from about 70% to 78%.

In certain embodiments, the chitosan may include oxidized chitosan. Suitable chitosan-based compounds that may be oxidized include, but are not limited to, chitosan and chitosan salts of mineral or organic acids. A wide variety of oxidizers may be used to oxidize the chitosan. Examples of suitable oxidizers include, but are not limited to sodium hypochlorite, sodium chlorite, sodium persulfate, sodium periodate, hydrogen peroxide, organic peroxides, peracetic acid, and mixtures thereof.

In certain embodiments, the chitosan may include modified chitosan. The term, "modified chitosan," as used herein, refers to chitosan grafted with additional functional groups, including, but not limited to, carboxymethyl groups, hydroxyethyl groups, hydroxypropyl groups, or combinations thereof. Other functional group modifications may be suitable as recognized by one skilled in the art with the benefit of this disclosure.

The chitosan is added to the fluid of the current application in an amount sufficient to crosslink with titanate to achieve the desired effect, such as suspending and delivering proppant to the subterranean formation. In certain embodiments, the chitosan may be present in the fluid in an amount of from about 0.5% to about 15% by weight of the fluid. In certain other embodiments, the chitosan may be present in the fluid in an amount of from about 0.65% to about 5% by weight of the fluid. In certain additional embodiments, the chitosan may be present in the fluid in an amount of from about 0.8% to about 3% by weight of the fluid. In certain specific embodiments, the chitosan may be present in the fluid in an amount of about 0.96%, 1.2%, or 3% by weight of the fluid.

To facilitate the dissolution of the chitosan, the fluid of the current application can be adjusted to a pH environment that is lower than neutral. In certain embodiments, the pH value of the fluid may be in a range from about 2 to about 6.5. In certain other embodiments, the pH value of the fluid may be in a range from about 3 to about 6. In certain additional embodiments, the pH value of the fluid may be in a range from about 4.5 to about 5.7. In certain specific embodiments, the pH value of the fluid is about 4.9 or 5.7.

As used herein, the term "titanate" refers to any organic or inorganic salt of titanium oxides or other titanium-containing anions. Examples of titanate anions may include, but are not limited to, organic or inorganic salts of $[TiO_4]^{4-}$, $[TiCl_6]^{2-}$ and $[Ti(CO)_7]^{2-}$. Specifically, in certain embodiments, the titanate anion is $[TiO_4]^{4-}$. Examples of titanate salts may include, but are not limited to, triethanolamine titanate, titanium ammonium lactate, titanium acetylacetonate, magnesium titanate, and the like. In certain specific embodiments, the titanate is triethanolamine titanate. Further information about titanate crosslinkers can be found in U.S. Pat. No. 4,861,500, the entire content of which is incorporated herein by reference.

To facilitate the dissolution of the titanate in the fluid of the current application, the titanate can be optionally dissolved in a suitable medium before it is introduced to the chitosan solution. Examples of such suitable medium include, but are not limited to, polyol such as propan-t-ol, acid such as acetic acid or glycolic acid, and their mixtures.

The amount of the titanate in the fluid of the current application should be sufficient to provide the desired crosslinking effect with the chitosan. As used herein, the terms "crosslink", "crosslinked" or "crosslinking" should be construed broadly. In some embodiments, the terms refer to chemical crosslinking (sometimes called "conventional crosslinking") by way of covalent bonds or ionic bonds that link one polymer chain to another. In some other embodiments, the terms "crosslink", "crosslinked" or "crosslinking" as used herein refer to physical crosslinking (sometimes called "non-conventional crosslinking") in that the increase in viscosity and/or stability of the material is achieved via the microstructure of the polymers instead of chemical bonds. In some further embodiments, the terms "crosslink", "crosslinked" or "crosslinking" as used herein refer to a combination of chemical crosslinking and physical crosslinking.

Accordingly, the term "chitosan crosslinked by titanate," as used herein, refers to a semi-rigid, jelly-like mass formed when the chitosan is crosslinked by titanate. A fluid containing chitosan crosslinked by titanate has an increased viscosity compared with a solution containing chitosan without titanate. The crosslinked gel formed by the chitosan and the titanate should be stable for the desired period of time at the temperature of the subterranean formation. A relatively short gel stability may be preferred for temporarily reaching a portion of a subterranean formation. A relatively long gel stability may be useful where sustained treatment of a portion of a subterranean formation is desired.

In certain embodiments, the titanate may be present in an amount in the range of from about 0.005% to about 5% by weight of the composition. In certain other embodiments, the titanate may be present in an amount in the range of from about 0.01% to about 0.5% by weight of the composition. In certain additional embodiments, the titanate may be present in an amount in the range of from about 0.05% to about 0.2% by weight of the composition. In certain specific embodiments, the titanate may be present in an amount of about 0.077%, 0.088%, or 0.099% by weight of the composition.

With respect to the ratio between the amount of chitosan and the amount of titanate in the fluid of the current application, it should be sufficient to provide the desired crosslinking between the chitosan and the titanate. In certain embodiments, the weight ratio between chitosan and titanate in the fluid of the current application is in the range of from about 1:10 to about 3000:1. In certain other embodiments, the weight ratio between chitosan and titanate in the fluid of the current application is in the range of from about 1:1 to about 500:1. In certain additional embodiments, the weight ratio between chitosan and titanate in the fluid of the current application is in the range of from about 4:1 to about 60:1. In certain specific embodiments, the weight ratio between chitosan and titanate in the fluid of the current application is about 10:1, 12:1, 30:1, or 39:1.

The fluid of the current application containing chitosan and titanate has an increased viscosity compared with a solution containing chitosan without titanate. In certain embodiments, the viscosity of the fluid containing chitosan crosslinked by titanate is at least 1.5 times of that of the solution containing chitosan without being crosslinked by titanate. In certain embodiments, the viscosity of the fluid containing chitosan crosslinked by titanate is at least 2 times of that of the solution containing chitosan without being crosslinked by titanate. In certain embodiments, the viscosity of the fluid containing chitosan crosslinked by titanate is at least 3 times of that of the solution containing chitosan without being crosslinked by titanate.

In certain embodiments, the fluid of the current application contains primarily chitosan crosslinked by titanate and is substantially free from other polymers such as polysaccharides. In certain embodiments, the fluid of the current application containing chitosan crosslinked by titanate may optionally further comprise at least one other polymer such as polysaccharides. In this respect, the weight ratio between chitosan and other polymer(s) in some cases can be at least about 1:10. In some other cases, the weight ratio between chitosan and other polymer(s) is at least about 1:5. In some further cases, the weight ratio between chitosan and other polymer(s) in the fluid of the current application is at least about 1:1. In certain embodiments, the weight ratio between chitosan and other polymer(s) in the fluid of the current application is at least about 5:1. In certain embodiments, the weight ratio between chitosan and other polymer(s) in the fluid of the current application is at least about 10:1.

In certain embodiments, the fluid of the current application contains primarily chitosan crosslinked by titanate and is substantially free from other crosslinkers such as barium or zirconium. In certain embodiments, the fluid of the current application containing chitosan crosslinked by titanate may optionally further comprise at least one other crosslinker such as barium or zirconium. In this respect, the weight ratio between titanate and other crosslinker(s) in some cases can be at least about 1:10. In some other cases, the weight ratio between titanate and other crosslinker(s) is at least about 1:5. In some further cases, the weight ratio between titanate and other crosslinker(s) in the fluid of the current application is at least about 1:1. In certain embodiments, the weight ratio between titanate and other crosslinker(s) in the fluid of the current application is at least about 5:1. In certain embodiments, the weight ratio between titanate and other crosslinker(s) in the fluid of the current application is at least about 10:1.

In certain embodiments, the fluid of the current application containing chitosan crosslinked by titanate has a viscosity of at least 100 cps at 100° F. about 30 minutes after mixing the chitosan and the titanate. In certain other embodiments, the fluid of the current application containing chitosan crosslinked by titanate has a viscosity of at least 200 cps at 100° F. about 30 minutes after mixing the chitosan and the titanate. In certain further embodiments, the fluid of the current application containing chitosan crosslinked by titanate has a viscosity of at least 400 cps at 100° F. about 30 minutes after mixing the chitosan and the titanate.

Optionally, the liquid of the current application may further include a gelation-retarding additive. As used herein, the term "gelation-retarding additive" refers to an additive that acts to at least partially delay the crosslinking between the chitosan and the titanate, e.g., the gelation of the chitosan-titanate compositions. Delaying the gelation of the fluid of the current application may be desirable to increase the pumping time before gelation at a given temperature. In certain embodiments, the fluid of the current application may have a gelation time sufficient to allow delivery of the fluid to the desired portion of a subterranean formation before the fluid becomes substantially viscosified. The addition of a gelation-retarding additive may allow the fluid of the current application to be used at higher temperatures than would otherwise be possible without the gelation-retarding additive.

In addition to the amount and type of gelation-retarding additive included in the fluid of the current application, the gelation time may be further controlled by adjusting a number of factors, including the type of aqueous fluid used, concentrations of components used, the pH, the temperature, and a variety of other factors. Optionally, the liquid of the current application may further include a non-emulsifier, an emulsifier inhibitor, a non-emulsifier enhance, and/or a scale inhibitor. All of such variations should be considered within the spirit of the current application.

According to another aspect of the current application, there is provided a method of treating a subterranean formation penetrated by a wellbore. An example of such a method may comprise mixing chitosan and a titanate in a carrying medium, allowing the titanate to crosslink chitosan and form a crosslinked gel, introducing the crosslinked gel into a subterranean formation, and treating the subterranean formation with the crosslinked chitosan-titanate gel.

The viscosity of the crosslinked chitosan-titanate gel can be reduced to a low value so that it may flow naturally from the formation under the influence of formation fluids. A breaker can be employed to achieve this objective. An exemplary breaker is ammonium persulfate, although other breakers may be used in the current application as well.

According to certain other aspects of the current application, embodiments disclosed herein may be useful to alter, block, and/or control the flow of fluids in subterranean formations. One specific example is a diversion operation in a subterranean formation, where crosslinked chitosan-titanate gel is of a sufficient viscosity to at least temporarily block the flow of fluids in and out of the subterranean formation.

To facilitate a better understanding of the present invention, the following example of certain aspects of some embodiments is given. In no way should the following example be read to limit, or define, the scope of the invention.

EXAMPLES

Example 1

Chitosan Crosslinked by Titanate

Chitosan solution was prepared by mixing the following ingredients in tap water:

| Ingredients | Concentration |
|---|---|
| Chitosan (Sigma-Aldrich Product No. 419419) | 100 lb/1000 gal (1.2 wt %) |
| KCl | 2 wt % |
| Acetic Acid | 2 gal/1000 gal |

The pH value of the chitosan solution so prepared was 5.7.

Titanate solution was prepared by dissolving triethanolamine titanate (CAS No. 36673-16-2) in suitable amount of propan-2-ol and acetic acid so that a light yellow colored solution was obtained. After preparation, each gallon of the titanate solution contained approximately 40 wt % triethanolamine titanate. The relative density of the solution to water was 1.1 at 25° C.

Figure 1B:
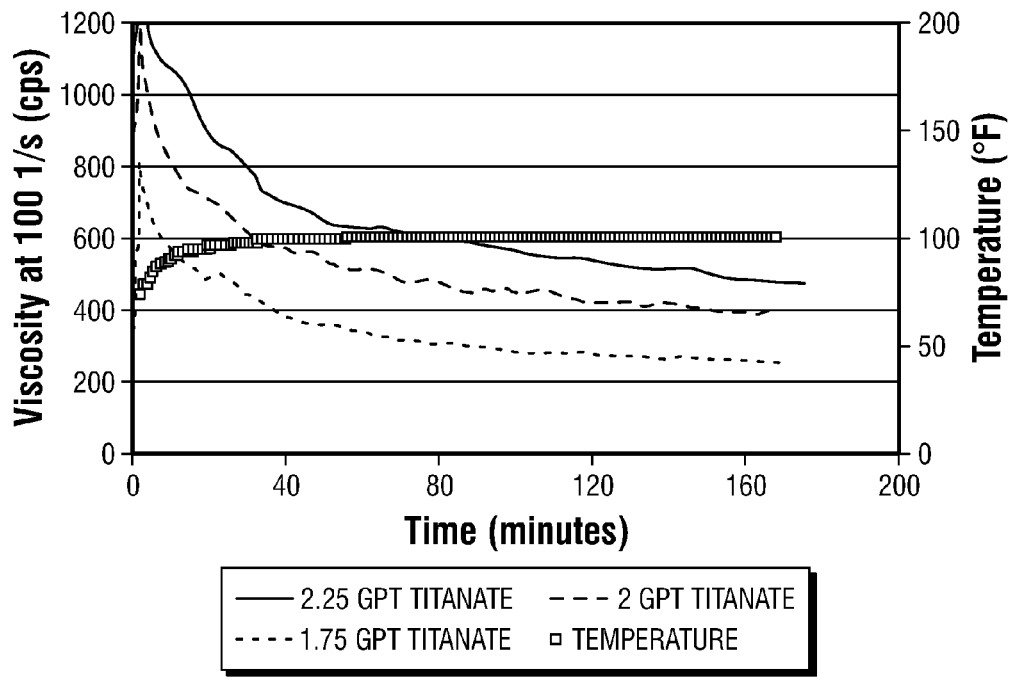
FIG. 1B shows viscosity temperature profiles for fluids containing chitosan crosslinked by titanate at various concentrations at 100° F.
Figure 1C:
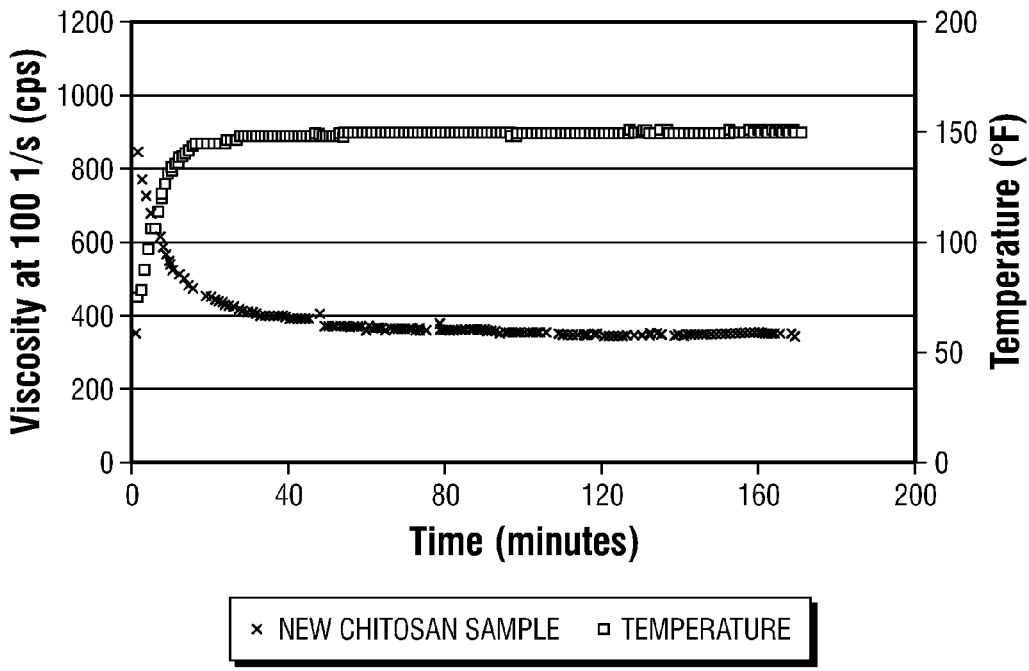
FIG. 1C shows viscosity temperature profile for a fluid containing a new batch of chitosan solution crosslinked by titanate at 150° F.
Figure 1D:
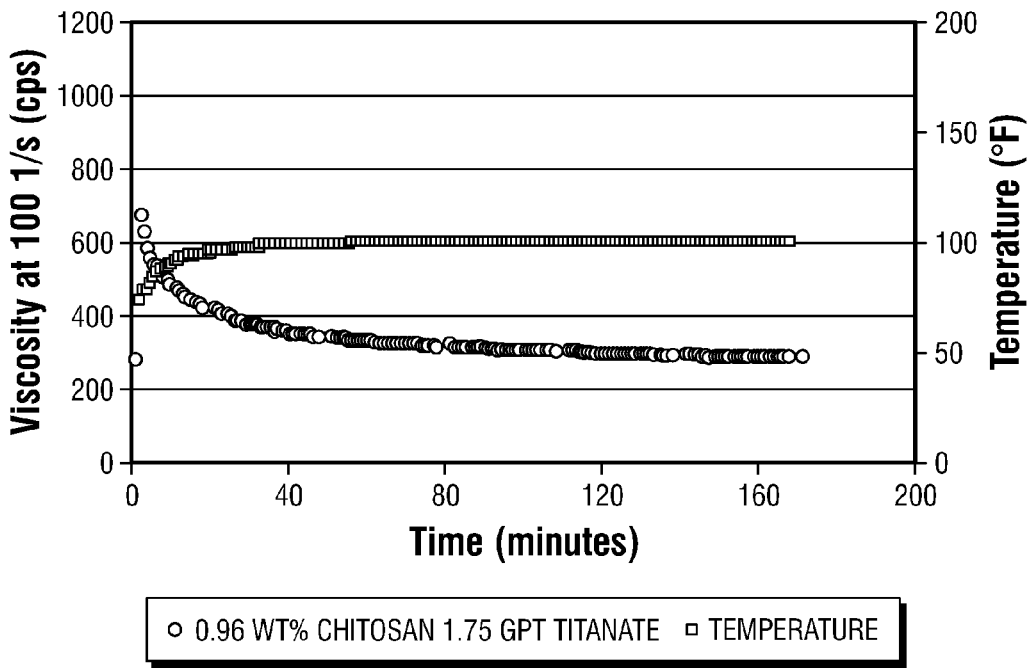
FIG. 1D shows viscosity temperature profile for a fluid containing a reduced amount of chitosan (0.96 wt %) crosslinked by titanate at 100° F.

Three different concentrations of the titanate solution were added to the chitosan solution: 1.75 gallon per thousand gallons (gpt), 2 gpt, and 2.25 gpt. The mixtures were heated to two different temperatures, 150° F. and 100° F. The results are shown in FIG. 1A (150° F.) and FIG. 1B (100° F.), respectively. A new batch of chitosan solution was prepared and tested at 150° F. with 2.25 gpt of titanate solution, the result of which is shown in FIG. 1C. A reduced amount of chitosan (0.96 wt %) was also prepared and tested at 100° F. with 1.75 gpt of titanate solution, the result of which is shown in FIG. 1D.

As illustrated in the figures, the addition of titanate sharply increased the viscosity of the chitosan solution. Thereafter, the viscosity of the mixed solution gradually decreased over time and reached a relatively stable level approximately 20 min to 60 min after the addition of titanate, depending on the specific concentrations of the ingredients in the solution. In general, when more titanate was added into the chitosan solution, higher viscosities were observed, and when the mixture was maintained at a lower temperature, higher viscosities were observed. For example, at 150° F., about 30 cps was observed in the absence of titanate. However, with 2.25 gpt titanate solution, over 300 cps was observed at 150° F. On the same token, at 100° F., without titanate, the chitosan solution exhibited a baseline viscosity of about 50 cps. With 2.25 gpt titanate solution, about 500 cps was observed at 100° F. after 2.5 hours.

The experiment was substantially reproducible—a new batch of chitosan solution was tested and shown in FIG. 1C. Moreover, a 20% reduction in chitosan concentration did not significantly alter the result (FIG. 1D).

Example 2

Viscosity Reduction by Ammonium Persulfate

The chitosan solution and the titanate solution were prepared as in Example 1.

Figure 2A:
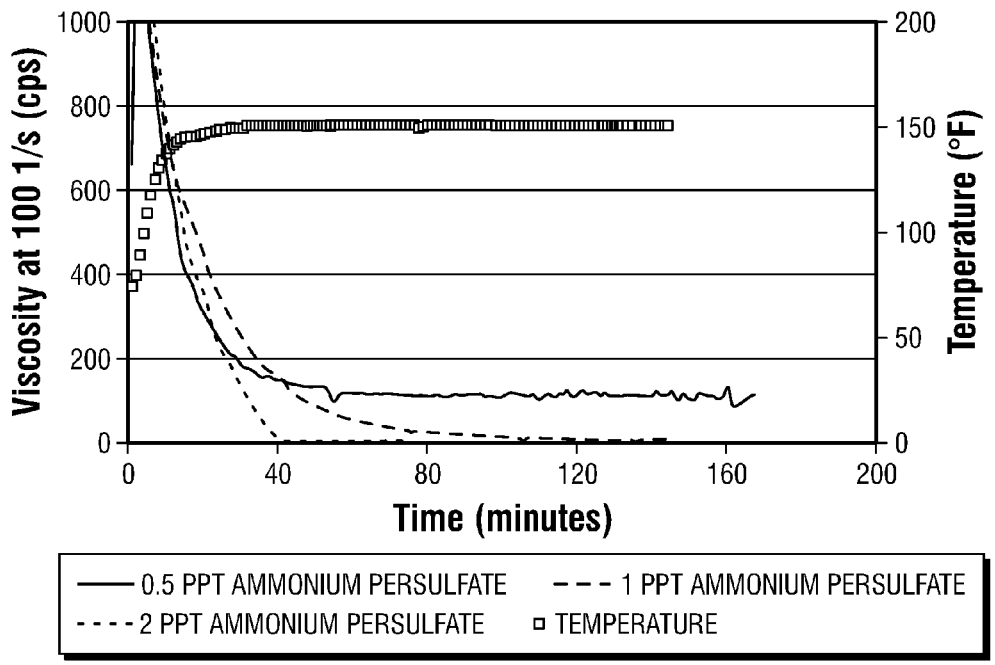
FIG. 2A shows viscosity temperature profiles for fluids containing chitosan crosslinked by titanate with the addition of breaker ammonium persulfate at various concentrations at 150° F.
Figure 2B:
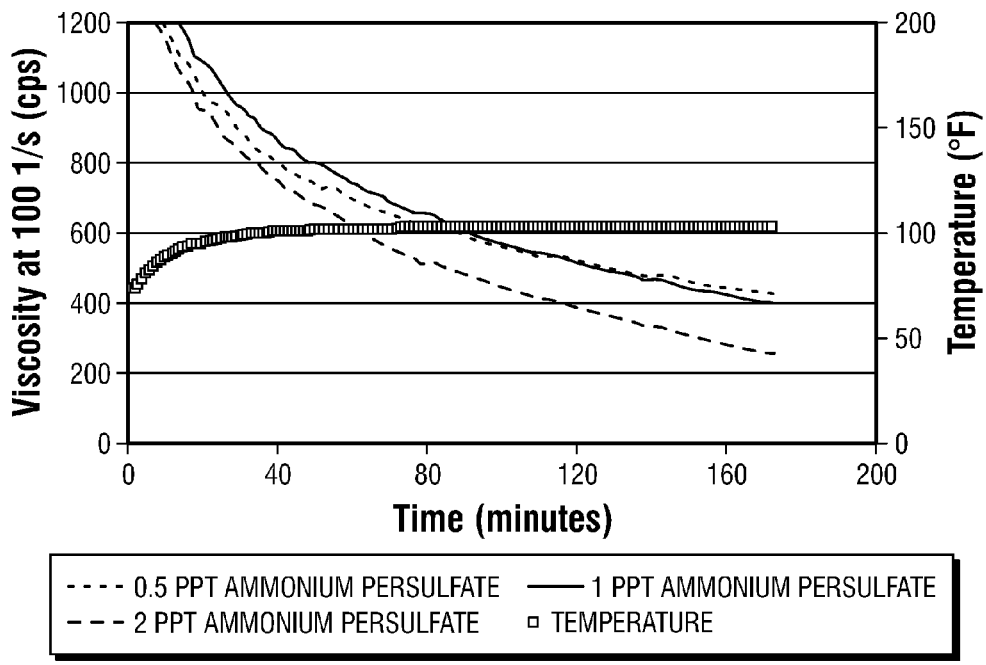
FIG. 2B shows viscosity temperature profiles for fluids containing chitosan crosslinked by titanate with the addition of breaker ammonium persulfate or sodium persulfate at various concentrations at 100° F.

Three different concentrations of the ammonium persulfate (CAS No. 7727-54-0) were mixed with the chitosan solution containing 2.25 gpt of the titanate solution as stated above. The three concentrations were: 0.5 pound-per-thousand gallon (ppt), 1 ppt, and 2 ppt. The mixtures were heated to two different temperatures, 150° F. and 100° F., as in the previous experiment. The results are shown in FIG. 2A (150° F.) and FIG. 2B (100° F.), respectively. At 150° F., 1 ppt of ammonium persulfate was effective to reduce the viscosity to less than 100 cps in approximately 40 minutes, while 2 ppt of ammonium persulfate drastically reduced the viscosity to 0 cps in approximately 40 minutes, suggesting that ammonium persulfate was effective to break the polymer backbone of the crosslink site. At 100° F., 2 ppt of ammonium persulfate was able to reduce the viscosity to about 300 cps after 2.5 hours.

Example 3

Higher Temperature

The chitosan solution and the titanate solution were prepared as in Example 1.

Figure 3A:
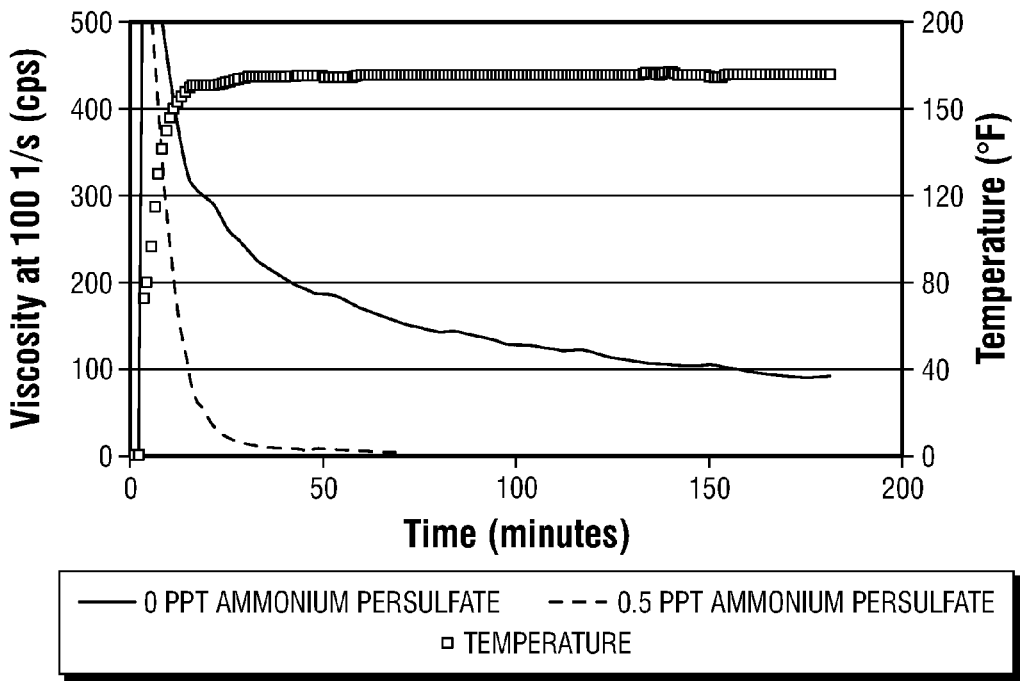
FIG. 3A shows viscosity temperature profiles for fluids containing chitosan crosslinked by titanate with or without breaker ammonium persulfate at 175° F.
Figure 3B:
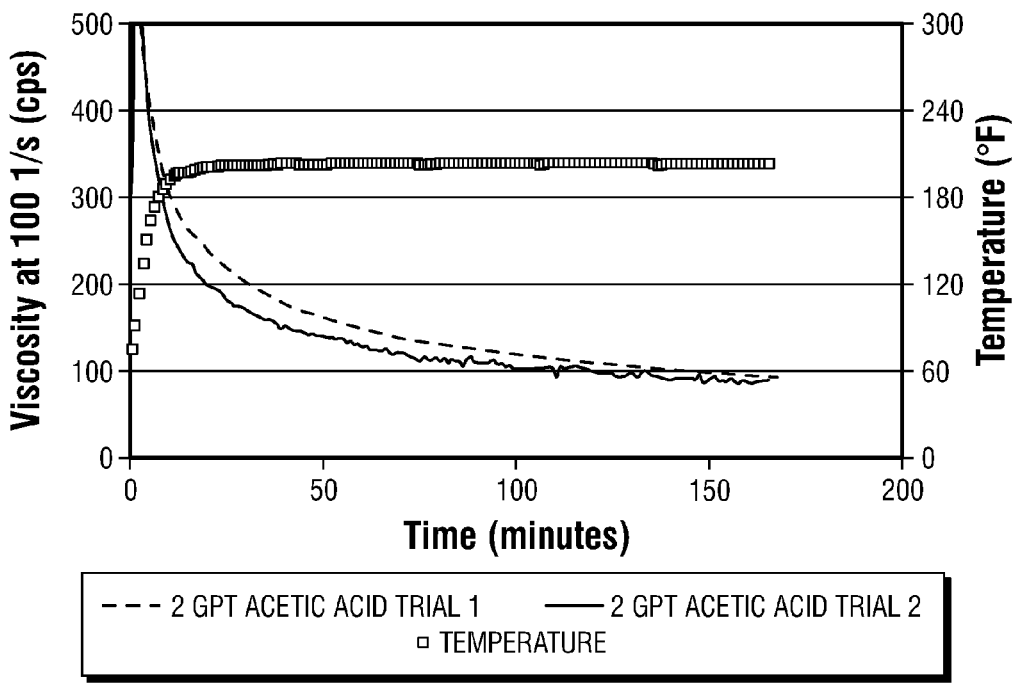
FIG. 3B shows viscosity temperature profiles for fluids containing chitosan crosslinked by titanate at 200° F.

The chitosan solution was mixed with 2.25 gpt of the titanate solution and the experiments were conducted at 175° F. and 200° F. Results are shown in FIG. 3A (175° F.) and FIG. 3B (200° F.), respectively. At both temperatures, the solution was able to maintain above 100 cps for 2 hours, suggesting that the solution was capable of suspending particles at these temperatures. At 175° F., 0.5 ppt of ammonium persulfate was effective to reduce the viscosity in 30 minutes.

Example 4

Lower pH

Chitosan solution was prepared by mixing 100 lb/1000 gal (1.2 wt %) of Chitosan (Sigma-Aldrich Product No. 419419) and 4 gal-per-thousand-gal of glycolic acid in tap water. The pH value of the solution was 4.9.

Figure 4:
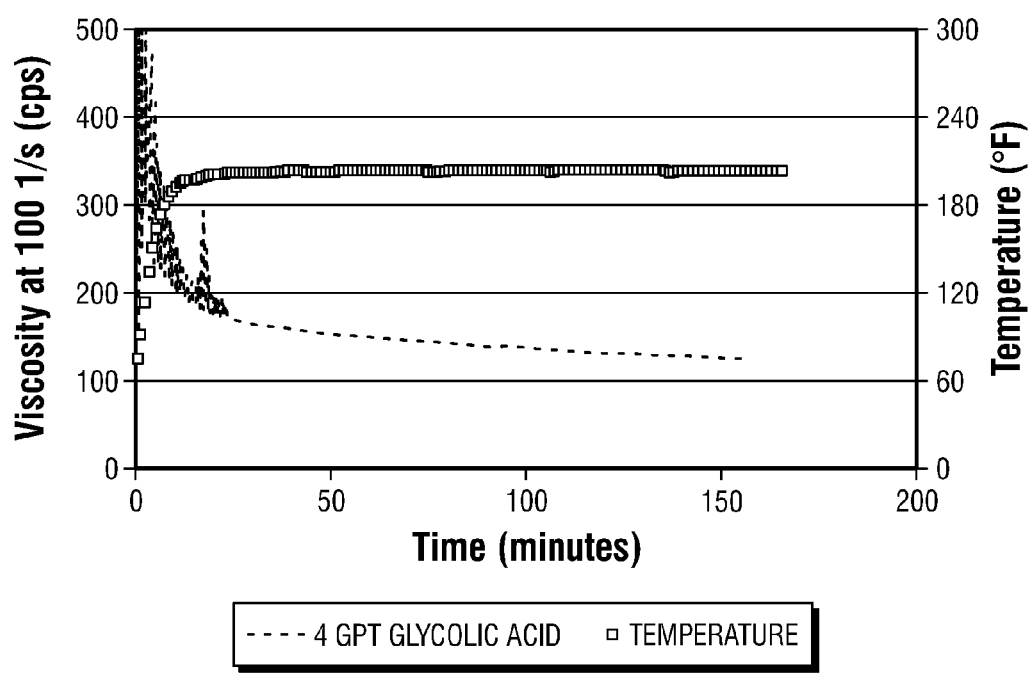
FIG. 4 shows viscosity temperature profile for a fluid containing a lower pH chitosan solution crosslinked by titanate at 200° F.

The glycolic-acid-containing chitosan solution was then mixed with 2.25 gpt of the titanate solution as prepared in Example 1 and tested at 200° F. The mixture showed higher viscosity compared with the acetic-acid-containing chitosan solution after about 50-60 min of testing (FIG. 4), suggesting that lower pH values may be more favorable comparing with higher pH values.

Example 5

Lower Concentration of Chitosan

Lower concentration of chitosan solution was prepared by mixing 80 lb/1000 gal (0.96 wt %) of Chitosan (Sigma-Aldrich Product No. 419419) and 4 gal-per-thousand-gal of glycolic acid in tap water. The pH value of the solution was 4.8.

Figure 5A:
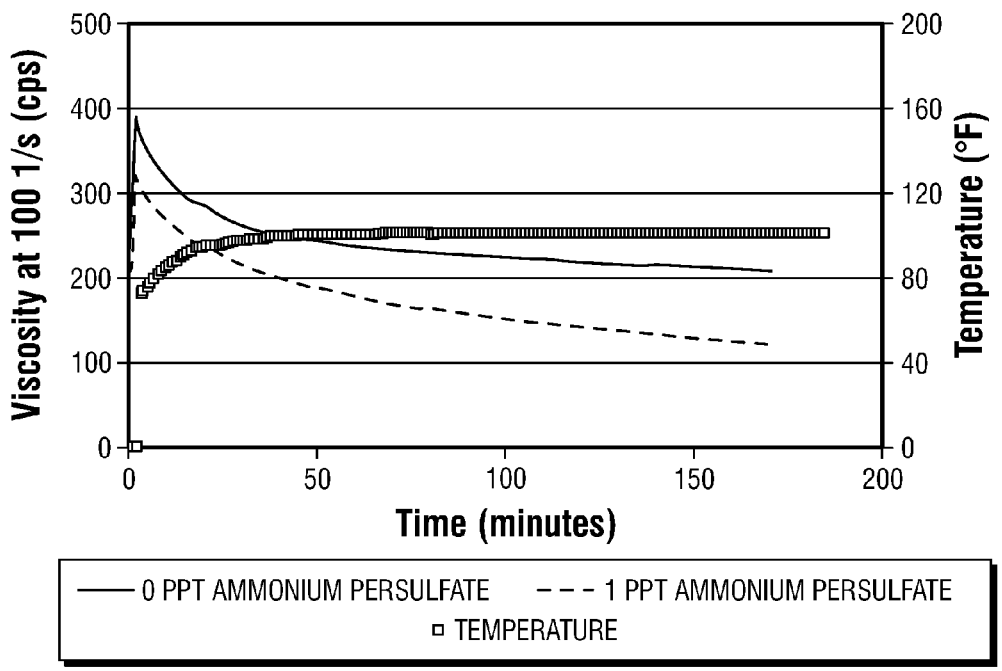
FIG. 5A shows viscosity temperature profiles for fluids containing a reduced amount of chitosan (80%) crosslinked by titanate with or without breaker ammonium persulfate at 100° F.
Figure 5B:
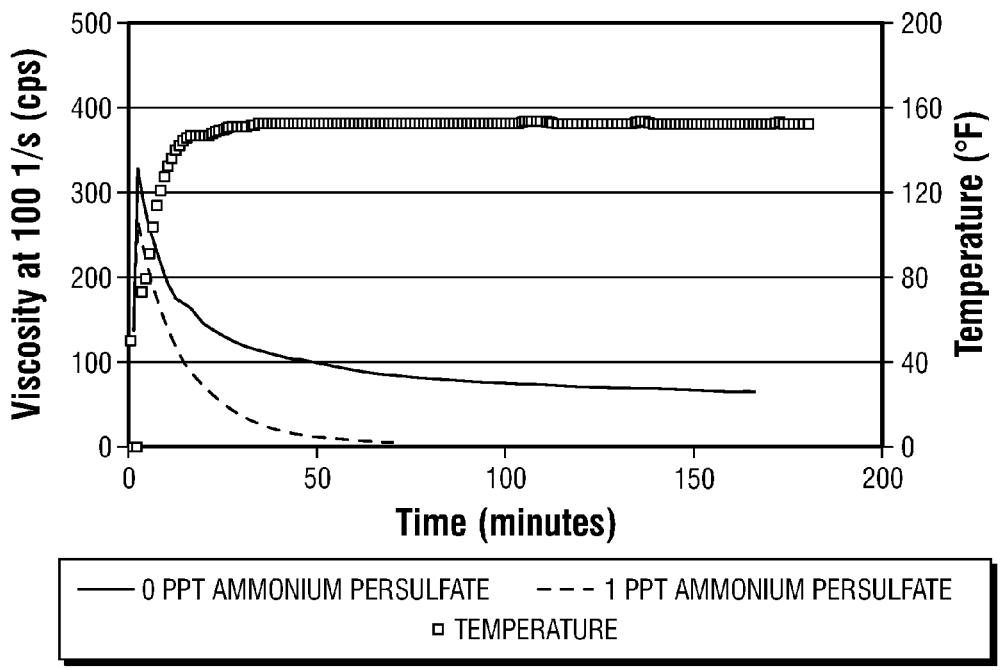
FIG. 5B shows viscosity temperature profiles for fluids containing a reduced amount of chitosan (80%) crosslinked by titanate with or without breaker ammonium persulfate at 150° F.

The reduced chitosan solution (80%) was then mixed with 2.25 gpt of the titanate solution as prepared in Example 1. Experiments were conducted at 100° F. and 150° F. and the results are shown in FIG. 5A (100° F.) and FIG. 5B (150° F.), respectively. Over 200 cps was observed at 100° F. after 3 hours. One ppt of ammonium persulfate reduced the viscosity to about 120 cps after 3 hours. At 150° F., the reduced chitosan solution (80%) maintained above 100 cps only for about 50 minutes and 1 ppt of ammonium persulfate was effectively in reducing the fluid viscosity to about zero cps.

Example 6

Higher Concentration of Chitosan

Higher concentration of chitosan solution was prepared by mixing the following ingredients in tap water:

| Ingredients | Concentration |
|---|---|
| Chitosan (Sigma-Aldrich Product No. 419419) | 250 lb/1000 gal (3 wt %) |
| Lactic Acid | 12.8 gal/1000 gal |

Figure 6A:
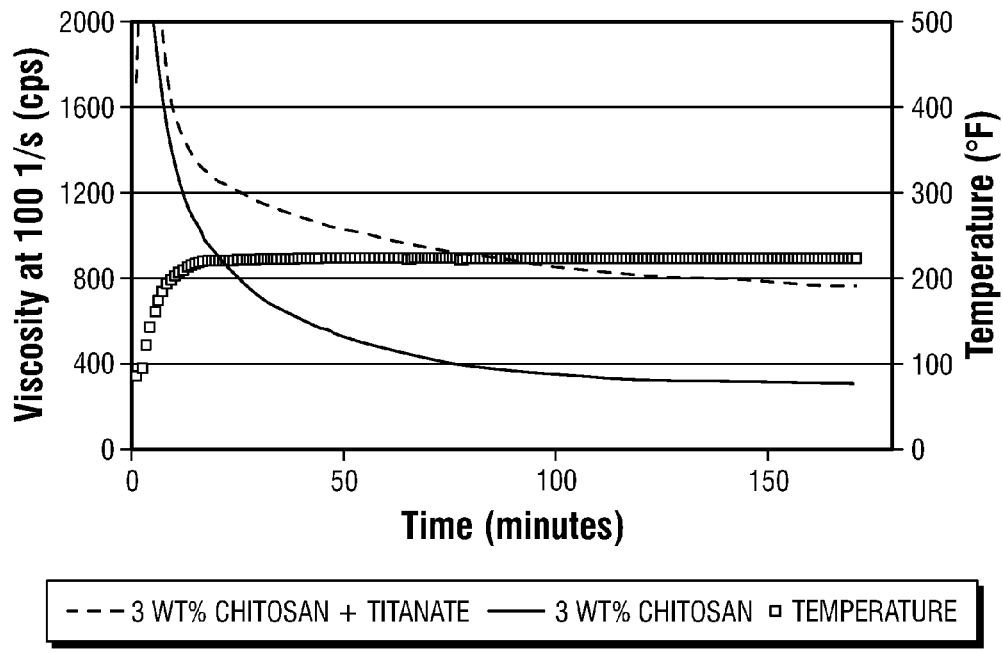
FIG. 6A shows viscosity temperature profiles for fluids containing an increased amount of chitosan (250%) crosslinked by titanate at 225° F.
Figure 6B:
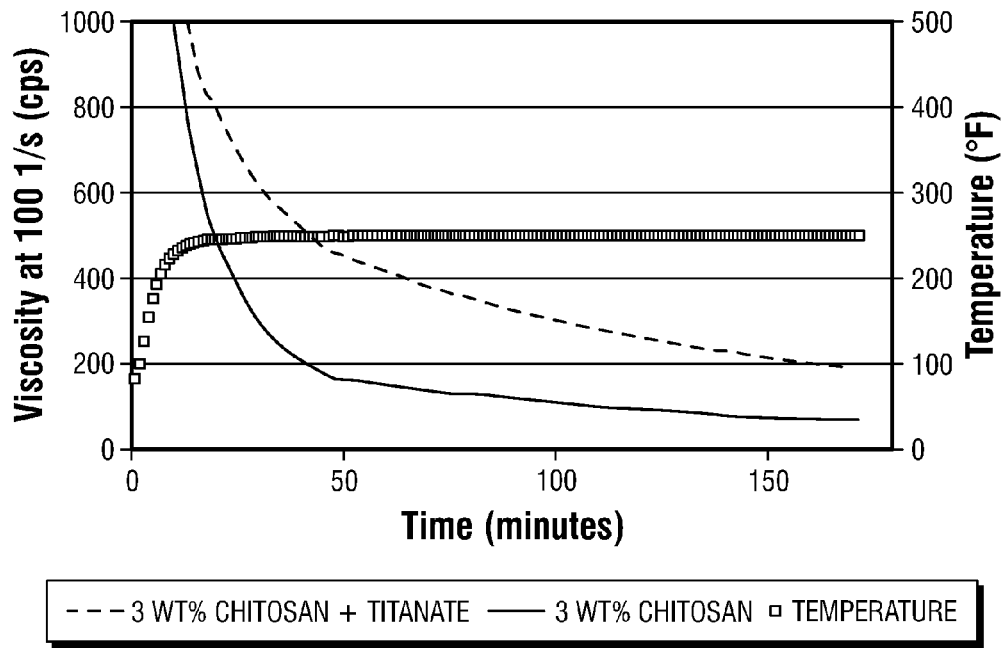
FIG. 6B shows viscosity temperature profiles for fluids containing an increased amount of chitosan (250%) crosslinked by titanate at 250° F.

The 3 wt % high-concentration chitosan solution was mixed with 2.25 ppt of the titanate solution as in Example 1 and tested at 225° F. and 250° F. The results are shown in FIG. 6A (225° F.) and FIG. 6B (250° F.), respectively. Without the titanate solution, the 3 wt % high-concentration chitosan solution exhibited about 400 cps of viscosity after about 100 minutes at 225° F. With the titanate solution, the viscosity increased by about 2 folds to approximately 800 cps at 225° F. Similarly, at 250° F., about 100 cps was observed at approximately 100 minutes without the crosslinker titanate solution, and about 2 folds increase when the crosslinker was present.

The preceding description has been presented with reference to some illustrative embodiments of the Inventors' concept. Persons skilled in the art and technology to which this invention pertains will appreciate that alterations and changes in the described structures and methods of operation can be practiced without meaningfully departing from the principle, and scope of this invention. Accordingly, the foregoing description should not be read as pertaining only to the precise structures described and shown in the accompanying drawings, but rather should be read as consistent with and as support for the following claims, which are to have their fullest and fairest scope.

Furthermore, none of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC §112 unless the exact words "means for" are followed by a participle. The claims as filed are intended to be as comprehensive as possible, and NO subject matter is intentionally relinquished, dedicated, or abandoned.

We claim:

1. A fluid for treating a subterranean formation penetrated by a wellbore, said fluid comprising chitosan, a polymer and titanate and having an increased viscosity compared with a fluid containing chitosan without titanate, wherein the fluid contains substantially no polymer other than chitosan, wherein the weight ratio between chitosan and said other polymer is at least about 5:1, and wherein the chitosan is unoxidized chitosan, oxidized chitosan, unmodified chitosan or mixtures thereof.

2. The fluid of claim 1, wherein the fluid has an increased viscosity that is at least 1.5 times of a fluid containing chitosan without titanate.

3. The fluid of claim 2, wherein the fluid has an increased viscosity that is at least 2 times of a fluid containing chitosan without titanate.

4. The fluid of claim 3, wherein the fluid has an increased viscosity that is at least 3 times of a fluid containing chitosan without titanate.

5. The fluid of claim 1, wherein the chitosan is unmodified chitosan.

6. The fluid of claim 5, wherein the fluid contains about 0.5% to about 15% by weight of chitosan.

7. The fluid of claim 5, wherein the fluid contains about 0.65% to about 5% by weight of chitosan.

8. The fluid of claim 5, wherein the fluid contains about 0.8% to about 3% by weight of chitosan.

9. The fluid of claim 1, wherein the titanate is an organic or inorganic salt of titanium oxides or other titanium-containing anions.

10. The fluid of claim 6, wherein the titanate is triethanolamine titanate.

11. The fluid of claim 9, wherein the fluid contains about 0.005% to about 5% by weight of titanate.

12. The fluid of claim 11, wherein the fluid contains about 0.01% to about 0.5% by weight of titanate.

13. The fluid of claim 12, wherein the fluid contains about 0.05% to about 0.2% by weight of titanate.

14. The fluid of claim 1, wherein the weight ratio of the chitosan and the titanate is from about 1:10 to about 3000:1.

15. The fluid of claim 1, wherein the weight ratio of the chitosan and the titanate is from about 1:1 to about 500:1.

16. The fluid of claim 1, wherein the weight ratio of the chitosan and the titanate is from about 4:1 to about 60:1.

17. The fluid of claim 1, wherein the weight ratio between chitosan and said other polymer is at least about 10:1.

18. A method, comprising:
mixing chitosan, a polymer and titanate in a carrying medium;
forming a gelled fluid comprising chitosan, a polymer and titanate, wherein the fluid has an increased viscosity compared with a fluid containing chitosan without titanate;
introducing the gelled fluid to a subterranean formation penetrated by a wellbore; and
treating the subterranean formation with the gelled fluid,
wherein the fluid contains substantially no polymer other than chitosan,
wherein the weight ratio between chitosan and said other polymer is at least about 5:1, and
wherein the chitosan is unoxidized chitosan, oxidized chitosan, unmodified chitosan or mixtures thereof.

19. The method of claim 18, further comprising:
after forming a gel comprising chitosan and titanate, adding a proppant in the gel.

20. The method of claim 18, further comprising:
introducing a breaker to the gel to reduce a viscosity of the gel.

21. The method of claim 18, wherein said treating is performing a hydraulic fracturing operation on the subterranean formation.

22. A method, comprising:
introducing chitosan, a polymer and titanate to a fluid;
increasing a viscosity of the fluid to at least 1.5 times of a fluid containing chitosan without titanate,
wherein the fluid contains substantially no polymer other than chitosan,
wherein the weight ratio between chitosan and said other polymer is at least about 5:1, and
wherein the chitosan is unoxidized chitosan, oxidized chitosan, unmodified chitosan, or mixtures thereof.

23. The method of claim 22, wherein the viscosity of the fluid is increased to at least 2 times of a fluid containing chitosan without titanate.

24. The method of claim 23, wherein the viscosity of the fluid is increased to at least 3 times of a fluid containing chitosan without titanate.

25. The method of claim 22, wherein said introducing comprises adding chitosan to the fluid followed by adding titanate to the fluid containing chitosan.

26. The method of claim 22, wherein said introducing comprises adding chitosan to a first medium, adding titanate to a second medium, and mixing the first medium containing chitosan with the second medium containing titanate.

* * * * *